(12) United States Patent
Saluti

(10) Patent No.: US 8,962,750 B2
(45) Date of Patent: Feb. 24, 2015

(54) PEBBLE-BASED SURFACING MATERIALS

(75) Inventor: Gerald M. Saluti, Brick, NJ (US)

(73) Assignee: Landscape Structures Inc., Delano, MN (US)

( * ) Notice: Subject to any disclaimer, the term of this patent is extended or adjusted under 35 U.S.C. 154(b) by 148 days.

(21) Appl. No.: 13/545,402

(22) Filed: Jul. 10, 2012

(65) Prior Publication Data

US 2014/0017484 A1  Jan. 16, 2014

(51) Int. Cl.
| | | |
|---|---|---|
| *B32B 3/00* | (2006.01) | |
| *B32B 3/26* | (2006.01) | |
| *B32B 5/16* | (2006.01) | |
| *B32B 7/12* | (2006.01) | |
| *B32B 9/00* | (2006.01) | |
| *B32B 15/04* | (2006.01) | |
| *B32B 27/00* | (2006.01) | |
| *C08G 18/08* | (2006.01) | |
| *C08G 18/28* | (2006.01) | |
| *C08G 18/42* | (2006.01) | |
| *C08G 18/67* | (2006.01) | |
| *C08L 75/00* | (2006.01) | |
| *C09K 17/00* | (2006.01) | |
| *E01C 5/18* | (2006.01) | |

(52) U.S. Cl.
USPC ....... 524/590; 404/32; 428/316.6; 428/317.1; 428/317.5; 428/318.4; 428/319.3; 428/319.7; 428/319.9; 428/323; 428/327; 428/355 N; 523/132; 524/500; 524/507; 524/589; 524/871; 524/872; 524/873; 524/875

(58) Field of Classification Search
CPC ............. B32B 3/00; B32B 5/00; B32B 5/16; B32B 5/22; B32B 5/30; B32B 5/32; B32B 7/02; B32B 9/002; B32B 9/045; B32B 9/046; B32B 25/14; B32B 27/065; B32B 27/08; B32B 27/20; B32B 27/302; B32B 27/40; B32B 33/00; B32B 2260/046; B32B 2260/048; B32B 2264/0221; B32B 2264/0292; B32B 2266/0278; B32B 2270/00; B32B 2274/00; B32B 2305/30; B32B 2307/51; B32B 2307/554; B32B 2375/00; B32B 2471/00; C08G 18/06; C08G 18/0838; C08G 18/14; C08G 18/3203; C08G 18/36; C08G 18/40; C08G 18/42; C08G 18/4233; C08G 18/4238; C08G 18/4241; C08G 18/4277; C08G 18/721; C08G 18/722; E01C 5/18; E01C 9/00

USPC ......... 524/500, 507, 589, 590, 871, 872, 873, 524/875; 428/316.6, 317.1, 317.5, 318.4, 428/319.3, 319.7, 319.9, 323, 327, 355 N; 404/32; 523/132

See application file for complete search history.

(56) References Cited

U.S. PATENT DOCUMENTS

| | | | | |
|---|---|---|---|---|
| 3,546,148 | A * | 12/1970 | Diamond et al. | ............ 528/74.5 |
| 3,869,421 | A * | 3/1975 | Sapp et al. | .................... 524/491 |
| 2003/0090016 | A1* | 5/2003 | Petrovic et al. | ................. 264/31 |
| 2004/0126557 | A1* | 7/2004 | Thiele et al. | ............... 428/304.4 |

* cited by examiner

*Primary Examiner* — Patrick Niland
(74) *Attorney, Agent, or Firm* — Christopher L. Holt; Kelly, Holt & Christenson, PLLC

(57) ABSTRACT

Pebble or granular based elastomeric surfacing materials that include an aliphatic thermoplastic polyurethane based pebble or granule bonded together with a two-part aliphatic polyurethane binder are provided. In one embodiment, an A side of the two-part binder has at least one polyol, and a B side of the two-part binder has multiple isocyanates. The multiple isocyanates can include for example hydrogenated methylene diphenyldisocyanate and hexamethylene diisocyanate. The A side and the B side of the binder are utilized to bond the pebbles together to form a surface that can be either porous or non-porous. In another embodiment, an A side of a two-part binder includes multiple polyols. The multiple polyols can include for example esterified ricinoleic acid polyols and caprolactone polyols. The A side of the two-part binder can be combined with a B side of the two-part binder and pebbles to form a non-porous surface. In yet another embodiment, a pebble-based surface is utilized as a wear layer in a multi-layer safety surface.

12 Claims, 3 Drawing Sheets

| | 102 | 104 | 106 | 108 | 110 |
|---|---|---|---|---|---|
| | Surfacing Material | A Side of Binder | B Side of Binder | Tensile Strength (psi) | Tensile Elongation (%) |
| 152 | Porous single isocyanate | COTP | HMDI | 122 | 48 |
| 154 | Porous multi-isocyanate | COTP | HMDI/HDI | 135 | 44 |
| 156 | Non-porous multi-isocyanate | ERP/CP | HMDI/HDI | 172 | 57 |

*Fig.1*

| Wear Layer | Buffer Layer | Cushion Layer | Fall Height |
|---|---|---|---|
| 0.4 inches | 1.125 inches | 1.0 inches | 4-7 feet |
| 0.4 inches | 1.125 inches | 2.0 inches | 8 feet |
| 0.4 inches | 1.125 inches | 4.0 inches | 9-10 feet |
| 0.4 inches | 1.125 inches | 6.0 inches | 11-12 feet |

Fig. 3

PEBBLE-BASED SURFACING MATERIALS

BACKGROUND

Surfacing materials can be applied to a traditional surface (e.g. concrete, asphalt, compacted aggregate base, etc.) to provide one or more enhanced features. For instance, surfacing materials can be used to improve fall protection, abrasion resistance, skid resistance, chemical resistance, aesthetics, thermal stability, and many other features of a surface. These enhanced surfaces may be beneficial in many settings such as, but not limited to, playgrounds, exercise areas, pools, and water activity areas.

SUMMARY

An aspect of the disclosure relates to pebble or granular based surfacing materials that contain aliphatic thermoplastic polyurethane based pebbles or granules that are chemically bonded utilizing two-part aliphatic polyurethane binders. In one embodiment, pebbles comprised of aliphatic thermoplastic polyurethane pebbles are bonded together with an A side of the two-part binder that has at least one polyol, and a B side of the two-part binder that has multiple isocyanates. The multiple isocyanates can include for example hydrogenated methylene diphenyldisocyanate and hexamethylene diisocyanate. The A side and the B side of the binder are utilized to bond the pebbles together to form a surface that can be either porous or non-porous.

In another embodiment, aliphatic thermoplastic pebbles are bonded utilizing an A side of a two-part binder that includes multiple polyols. The multiple polyols can include for example esterified ricinoleic acid polyols and caprolactone polyols. When the A side of the two-part binder is combined with a B side of the two-part binder, the multiple polyol mixture may result in little or no outgassing, which can be used to form a non-porous surface.

In yet another embodiment, a pebble-based surface is utilized as a wear layer in a multi-layer safety surface. The safety surface includes a buffer layer between the pebble-based wear layer and a cushion layer. The buffer layer can be used to compensate for differences in the coefficients of thermal expansion for the wear layer and the cushion layer. Additionally, the cushion layer may be foam-based, and a thickness of the cushion layer can be varied to provide different levels of fall height protection.

These and various other features and advantages that characterize the claimed embodiments will become apparent upon reading the following detailed description and upon reviewing the associated drawings.

BRIEF DESCRIPTION OF THE DRAWINGS

FIG. 1 includes a table showing three different examples of pebble-based surfacing materials.

FIG. 3 includes a table showing some examples of possible dimensions for safety surfaces and the resulting fall height protection.

DETAILED DESCRIPTION

Figure 2:
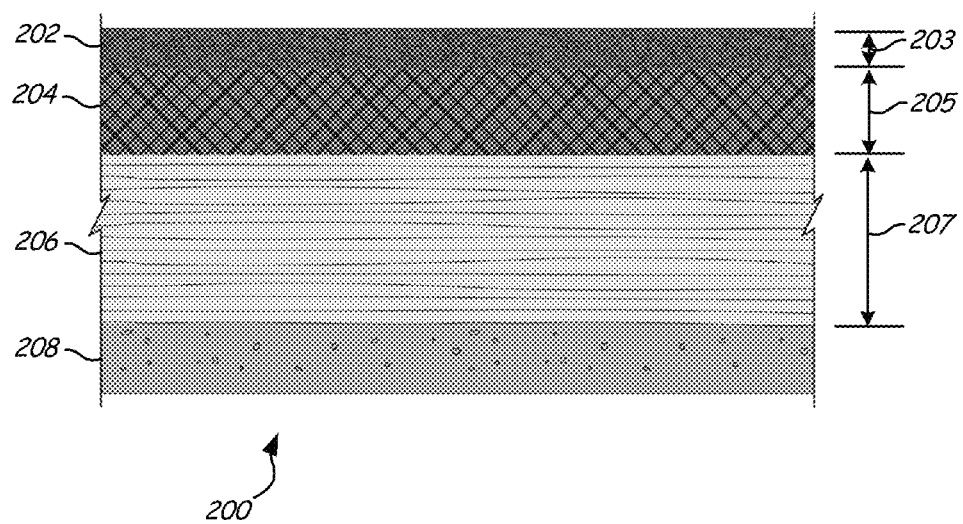
FIG. 2 is a schematic diagram of a multi-layer safety surface that has a pebble-based wear layer as its top layer.

Embodiments of the present disclosure illustratively include surfacing materials having pebbles that are bonded together utilizing two-part binders. In at least certain circumstances, these surfacing materials may provide advantages over existing surfacing materials (e.g. EPDM pour-in-place surfacing materials) such as, but not limited to, improved UV light stability, enhanced chemical resistance, improved curing, longer lifetime, improved safety performance, reduced outgas sing, etc. For example, in one embodiment, a two-part binder includes a side having multiple isocyanates that provides greater flexibility and elasticity, and that enables the binder to be cured over a greater range of temperature and humidity conditions. In another embodiment, a two-part binder includes a side having multiple polyols that may help to reduce outgassing. In yet another embodiment, a two-part binder can be used in a wear layer of a multi-layer safety surface that provides improved safety performance over a longer lifetime. These and various other features and advantages are discussed in greater detail below.

FIG. 1 includes a table 100 that shows some properties for three different types of surfacing materials 102. An example of an A side binder for each surfacing material is listed in column 104, and an example of a B side binder for each surfacing material is listed in column 106. Additionally, some experimental values for tensile strength and tensile elongation of the surfacing materials are shown in columns 108 and 110, respectively. Each of the surfacing materials can be placed over a traditional surface (e.g. concrete, asphalt, compacted aggregate base, etc.) to provide one or more enhanced features. In an embodiment, the surfacing materials are applied to a thickness of approximately three-eighths of an inch. However, embodiments are not limited to any particular thickness, and more or less than three-eighths of an inch of surfacing material can be used.

For each surfacing material 102 in table 100, the A side binder 104 is combined with the B side binder 106 to form a two-part binder. The two-part binder is used to bond pebbles together to form a surface. In one embodiment, the pebbles are aliphatic thermoplastic polyurethane spheres. For example, pebbles may be made using one or more of an aliphatic thermoplastic polyurethane, two hydrogenated styrene-ethylene-butadiene polymers, mineral oil, calcium carbonate, and ultraviolet stabilizers. Pebbles are not however limited to any particular composition, and or shape and can include other materials. Additionally, surfaces can include any relative amounts of binder and pebbles. For example, a surface may include approximately 10-25% binder and 75-90% pebbles, or any other relative amounts of binder and pebbles.

Row 152 in table 100 corresponds to a porous single isocyanate surfacing material. As can be seen in columns 104 and 106, one example of a binder A side for the surfacing material is a castor oil based tetrafunctional polyol ("COTP"), and one example of a binder B side for the surfacing material is a hydrogenated methylene diphenyldisocyanate ("HMDI"). The HDMI may be made from polypropylene glycol polyol ("PPG") and/or polytetramethylene glycol polyol ("PTMEG"). Additionally, the isocyanate contents of the HDMI are optionally relatively high in order to achieve high cross-link density of the two-part binders. For instance, the isocyanate contents of an HDMI polyisocyanate may be approximately 16% for a PTMEG based polyisocyanate, and 26% for a PPG based polyisocyanate. In another embodiment, the A side includes polycaprolactone polyol instead of, or in addition to the COTP. It should be noted however that embodiments of surfacing materials are not limited to any specific combination of materials, and that embodiments may include any combination of one or more materials shown in the figures or described in this specification.

Row 154 in table 100 corresponds to a porous multi-isocyanate surfacing material. The A side of the material is illustratively a COTP or a polycaprolactone polyol like the A side of the surfacing material in row 152. However, as is indicated in column 106, the B side of the material illustratively includes a mixture of HMDI and hexamethylene diisocyanate trimer ("HDI"). Accordingly, the B side has multiple types of polyisocyanates. In one embodiment, the B side includes 33-66% HMDI and 33-66% HDI. Embodiments are not however limited to HMDI and HDI polyisocyanate mixtures and could include polyisocyanates based on other aliphatic diisocyanates such as isophorone diisocyante (IPDI). Embodiments can include any relative amounts of HMDI, HDI, and or other polyisocyanates.

Row 156 in table 100 corresponds to a non-porous multi-isocyanate surfacing material. As can be seen in column 106, the B side of the material is illustratively a mixture of HMDI and HDI like the material in row 154. However, as is indicated in column 104, the A side of the material illustratively includes a mixture of esterified ricinoleic acid polyols ("ERP") and caprolactone polyols ("CP"). Accordingly, the A side has multiple different types of polyols. In one embodiment, the A side includes approximately 50% ERP and approximately 50% CP. Embodiments are again however not limited to any particular amounts, and embodiments can include any relative amounts of ERP and CP.

Additionally, it should be noted that in at least certain embodiments of non-porous surfacing materials, that relatively more binder may be used. For example, in a porous embodiment, approximately 10% binder and 90% pebbles may be used, and in a non-porous embodiment, approximately 18-25% binder and 75-82% pebbles may be used. Furthermore, it should also be noted that the pebbles may include a mixture of different sizes of pebbles (e.g. 50% large pebbles and 50% small pebbles). It was found that a lower amount of binder may be needed to provide a non-porous material when more small pebbles are used.

The porous surfacing materials in rows 152 and 154 illustratively generate a porous surface where carbon dioxide which is emitted when the two-part binders are cured can escape through the porous matrix and not diminish the strength or aesthetics of the surface. However, if these two-part binders are increased in concentration to create a non-porous surface the carbon dioxide emission during cure creates bubbling in the matrix diminishing physical properties and aesthetics. For the non-porous surfacing material in row 156, little or no carbon dioxide outgassing occurs when the ERP/CP binder is used, which results in a non-porous surface. As those skilled in the art will appreciate, it may sometimes be desirable to generate a porous surface, and at other times, it may be desirable to generate a non-porous surface. For example, in some settings, it is desirable to have a porous surface to prevent water from accumulating on the top of the surface. In other settings (e.g. in indoor and/or high humidity situations), it is desirable to have a non-porous surface to prevent mold and bacteria from growing within the surface. Accordingly, embodiments of the present disclosure enable both porous and non-porous surfaces to be created as needed.

It should also be highlighted that the surfacing material in row 152 includes a single isocyanate (e.g. HMDI), and the surfacing materials in rows 154 and 156 include multiple isocyanates (e.g. HMDI/HDI). Although all of the listed materials can be used to create high performance surfaces (e.g. excellent chlorine resistance, durability, etc.), it may sometimes be beneficial to use the multi-isocyanate B side. For instance, in at least certain circumstances, the multi-isocyanates may provide increased tensile strength and elasticity/flexibility, faster curing times, and broader ability to modify cure rates using various catalyst levels. One example of this can be seen in column 108 of table 100 in which the single isocyanate surfacing material 152 has a tensile strength of 122 psi, while the multi-isocyanate surfacing materials 154 and 156 have higher tensile strengths of 135 psi and 172 psi, respectively. Also for example, it has been demonstrated that the multi-isocyanate materials can be cured at varying rates at low temperatures and/or low humidities. This is in contrast to other surfacing materials (e.g. single component binders) that do not cure completely at low temperatures and humidities, and that cannot be cured rapidly by catalyzation.

FIG. 2 shows an illustration of a multi-layer safety surface 200. Safety surface 200 includes wear layer 202, buffer layer 204, and cushion layer 206. The safety surface 200 can be applied to an existing surface 208 (e.g. concrete, asphalt, compacted aggregate base, etc.) to provide enhanced safety performance (e.g. greater fall protection).

The wear layer 202 is illustratively made from a pebble-based surfacing material, but could also be made from granular-based surfacing material. For example, the wear layer may include any one or more of the materials listed in FIG. 1 (e.g. the porous single isocyanate materials, the porous multi-isocyanate materials, and/or the non-porous multi-isocyanate materials). Additionally, the wear layer 202 has a thickness 203 that is optionally between 0.25 and 0.5 inches.

The buffer layer 204 is illustratively a flexible elastomer that can compensate for differences in the coefficients of thermal expansion for the wear layer 202 and the cushion layer 206. Accordingly, buffer layer 204 enables safety surface 200 to withstand large temperature swings and reduces stresses in the wear layer 202. In one embodiment, the buffer layer 204 includes styrene butadiene rubber ("SBR") shred that may be bonded with aromatic polyurethane. In another embodiment, the buffer layer 204 includes either extruded polyethylene vinyl acetate sheet or another similar flexible extruded elastomer sheet. Embodiments are not however limited to any particular material and may include any suitable flexible elastomer. The buffer layer 204 has a thickness 205 that is optionally between 0.5 and 3.0 inches (e.g. 0.75-3.0 inches of bonded SBR shred, or 0.50-0.75 inches of polyethylene vinyl acetate sheet).

The cushion layer 206 is illustratively a foam material. For example, layer 206 may include closed cell cross-linked polyethylene foam ("CCCLPEF") having a density of 2 to 8 pounds per a cubic foot. Other types of foam may be used such as polyurethane or polypropylene. The cushion layer 206 has a thickness 206 that is optionally between 0.75 and 6.00 inches. In an embodiment, the thickness 206 is dependent upon a desired fall height protection. For instance, a thicker cushion layer 206 may provide protection from a higher fall height.

FIG. 3 includes a table 300 that shows some examples of possible dimensions for safety surfaces and the resulting fall height protection. Column 302 lists thicknesses of a wear layer. Column 304 lists thicknesses of a buffer layer. Column 306 lists thicknesses of a cushion layer, and column 308 lists the fall height protection corresponding to the given wear layer, buffer layer, and cushion layer thicknesses. As can be seen in the table, the fall height protection 308 increases as the thickness of the cushion layer 306 increases. In an embodiment, the wear layer 302 includes an aliphatic thermoplastic pebble-based surfacing material with a two-part binder (e.g. COTP/HMDI, COTP/HMDI/HDI, ERP/CP/HMDI/HDI, etc.), the buffer layer 304 includes SBR, and the foam layer 306 includes CCCLPEF. Embodiments of safety surfaces can however include any one of the materials or any combination of the materials discussed above.

The surfacing materials described in this specification and shown in the figures can illustratively provide one or more features to enhance the performance of a surface. For example, the surfacing materials generally provide good resistance to chlorine and do not fade with exposure to UV light. The surfacing materials may also improve abrasion resistance, skid resistance, flexibility, strength, durability, and thermal stability of a surface. The surfacing materials can also be cured under a wider range of conditions (e.g. lower temperatures and/or humidities) than other surfacing materials (e.g. moisture cured single component binder systems). These enhanced surfaces may be beneficial in many settings such as, but not limited to, playgrounds, exercise areas, pools, and water activity areas. The materials are not however limited to any particular use, and can be used in other settings as well.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. Surfacing materials comprising:
   an A side of a two-part binder having at least one polyol, wherein at least one polyol includes castor oil based tetrafunctional polyol;
   a B side of the two-part binder having multiple isocyanates; and
   pebbles or granules that are bonded together utilizing the A side and the B side of the two-part binder.

2. The surfacing materials of claim 1, wherein the multiple isocyanates include polyisocyanates based on hydrogenated methylene diphenyldisocyanate.

3. The surfacing materials of claim 1, wherein the multiple isocyanates include polyisocyanates based on hexamethylene diisocyanate.

4. The surfacing materials of claim 1, wherein the multiple isocyanates include polyisocyanates based on isophorone diisocyanate.

5. The surfacing materials of claim 1, wherein the at least one polyol includes multiple polyols.

6. The surfacing materials of claim 1, where the at least one polyol includes polycaprolactone polyol.

7. The surfacing materials of claim 1, wherein the two-part binder and the pebbles are utilized to form a top wear layer of a multi-layer safety surface.

8. Surfacing materials comprising:
   a two-part binder, wherein the two-part binder includes an A side having multiple polyols, and wherein the multiple polyols include at least esterified ricinoleic acid polyols and caprolactone polyols; and
   pebbles that are bonded together utilizing the two-part binder to form a non-porous surface.

9. The surfacing materials of claim 8, wherein the two-part binder includes a B side having multiple isocyanates.

10. The surfacing materials of claim 8, wherein the non-porous surface is utilized to form a top wear layer of a multi-layer safety surface.

11. The surfacing materials of claim 1, wherein the pebble or granule contains an aliphatic thermoplastic polyurethane.

12. The surfacing materials of claim 1, wherein the pebble or granule contains a thermoplastic hydrogenated styrene butadiene polymer.

* * * * *